(12) United States Patent
Jung (10) Patent No.: US 6,704,512 B1
(45) Date of Patent: Mar. 9, 2004

(54) WDM OPTICAL CHANNEL DISPERSION COMPENSATING AND MONITORING APPARATUS AND OPTICAL AMPLIFIER COMPRISING THE APPARATUS

(75) Inventor: Jae Hoon Jung, Kunpo-shi (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/455,518

(22) Filed: Dec. 7, 1999

(30) Foreign Application Priority Data

Dec. 10, 1998 (KR) .............................. 98-54233

(51) Int. Cl.$^7$ ................................ H04J 14/02
(52) U.S. Cl. ........................ 398/87; 398/81; 398/29; 398/34
(58) Field of Search ................. 359/161, 110; 398/29, 34, 81, 87

(56) References Cited

U.S. PATENT DOCUMENTS

| | | | |
|---|---|---|---|
| 5,636,301 A | | 6/1997 | O'Sullivan et al. ............ 385/24 |
| 5,699,468 A | * | 12/1997 | Farries et al. ................. 385/140 |
| 5,812,306 A | | 9/1998 | Mizrahi ........................ 359/341 |
| 5,909,295 A | * | 6/1999 | Li et al. ........................ 359/130 |
| 5,943,151 A | * | 8/1999 | Grasso et al. ................. 359/135 |
| 5,982,791 A | * | 11/1999 | Sorin et al. ................... 372/25 |
| 5,982,963 A | * | 11/1999 | Feng et al. .................... 359/188 |
| 6,049,413 A | * | 4/2000 | Taylor et al. ................. 359/161 |
| 6,118,561 A | * | 9/2000 | Maki ............................ 359/124 |
| 6,122,418 A | * | 9/2000 | Ellis ............................. 359/128 |
| 6,137,604 A | * | 10/2000 | Bergano ....................... 359/124 |
| 6,373,609 B1 | * | 4/2002 | Mizrahi ........................ 359/124 |
| 6,400,475 B1 | * | 6/2002 | Kosaka et al. ............... 359/110 |

\* cited by examiner

*Primary Examiner*—Leslie Pascal
*Assistant Examiner*—David C Payne
(74) *Attorney, Agent, or Firm*—Fleshner & Kim LLP (57) ABSTRACT

An optical channel dispersion compensating and monitoring apparatus when an optical signal transmits from an optical transmitter to an optical receiver through an optical fiber is disclosed. A WDM optical amplifier comprising the optical channel dispersion compensating and monitoring apparatus, for a long distance is also disclosed. A WDM optical channel dispersion compensating and monitoring apparatus comprises a dispersion compensating unit for compensating the optical signal distorted in the optical fiber at each channel when the optical signal transmits from an optical transmitter to an optical receiver through the optical fiber and an optical channel monitoring unit for converting an optical power as the portion of the compensated optical signal to electric signals and monitoring the converted electric signals.

20 Claims, 10 Drawing Sheets

(a) OUTPUT OF THE FIRST OPTICAL AMPLIFYING UNIT ( (92) IN FIG.9 )

(b) OUTPUT OF THE OPTICAL CHANNEL DISPERSION COMPENSATING AND MONITORING DEVICE ( (93) IN FIG.9 )

FBG BANDWIDTH

WDM OPTICAL CHANNEL DISPERSION COMPENSATING AND MONITORING APPARATUS AND OPTICAL AMPLIFIER COMPRISING THE APPARATUS

BACKGROUND

1. Technical Field

The present invention relates to a signal maintenance and management technology in a Wavelength Division Multiplexed(WDM) transmission network. Particularly, the present invention relates to an optical channel: dispersion compensating and monitoring apparatus when an optical signal transmits from an optical transmitter to an optical receiver through an optical fiber.

And the present invention relates to a WDM optical amplifier comprising the optical channel dispersion compensating and monitoring apparatus, for a long distance.

2. Background

A WDM method is widely used for maximizing data transmission capacity by multiplexing optical signal having a plurality of wavelengths different from each other, on an optical fiber. In the WDM method where the optical signal having several channels is commonly existing, it is very important to figure out each channel state for an efficient maintenance and management of the transmission network, thereby it is essential to monitor the optical channel.

Additionally, in order to increase the data transmission capacity in the WDM method, the number of the optical channel should be increased or transmission speed of each optical channel should be improved. In case of improving the transmission speed of the optical channel, it may happen a serious signal distortion by the optical fiber dispersion as a frequency bandwidth of each optical signal becomes widen. Accordingly, it has been studied for establishing the optical channel dispersion compensating and monitoring technology in the bulk WDM transmission system.

When the optical signal is transmitted through the optical fiber, the transmission speed becomes different according to the optical wavelength. The dispersion is caused by the different transmission speed in the optical fiber. In the dispersion compensating technology, optical element(for example, a dispersion compensating optical fiber, a dispersion compensating filter, etc.) is used for compensating the optical signal distortion generated by the optical fiber dispersion, and thereby makes overall dispersion value to "0" by having a dispersion value opposite to the transmission optical fiber dispersion value.

Figure 1:
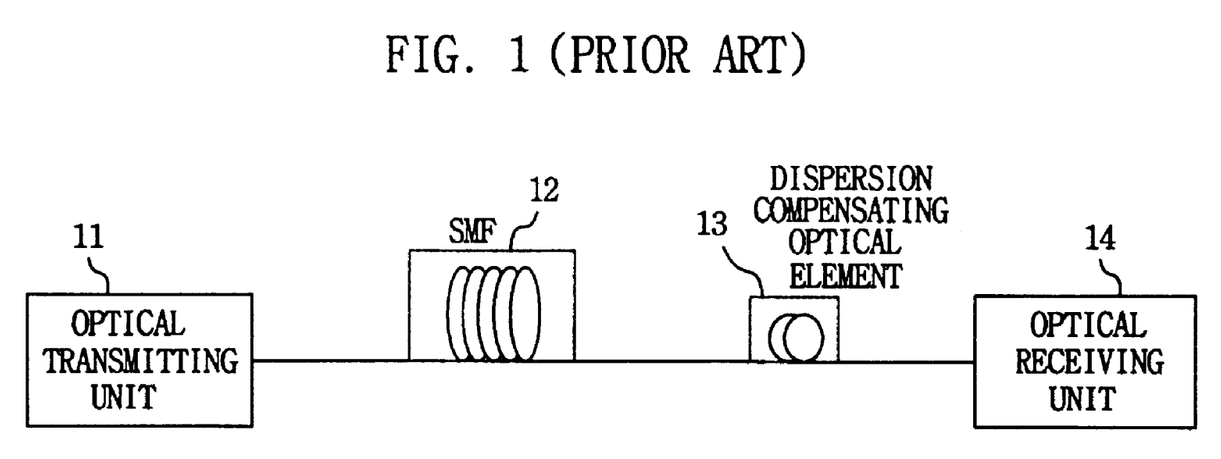
FIG. 1 shows a configuration diagram of a common dispersion compensating device.

FIG. 1 shows a configuration diagram of a common dispersion compensating device. An optical signal outputted from an optical transmitting unit 11, passes through a Single Mode Fiber(SMF) 12. When the optical signal passes through the SMF, the signal is distorted. A compensated optical signal is detected in an optical receiving unit 14 after passing through a dispersion compensating optical element 13. A location of the SMF 12 and the dispersion compensating optical element 13 may be changed.

Figure 2:
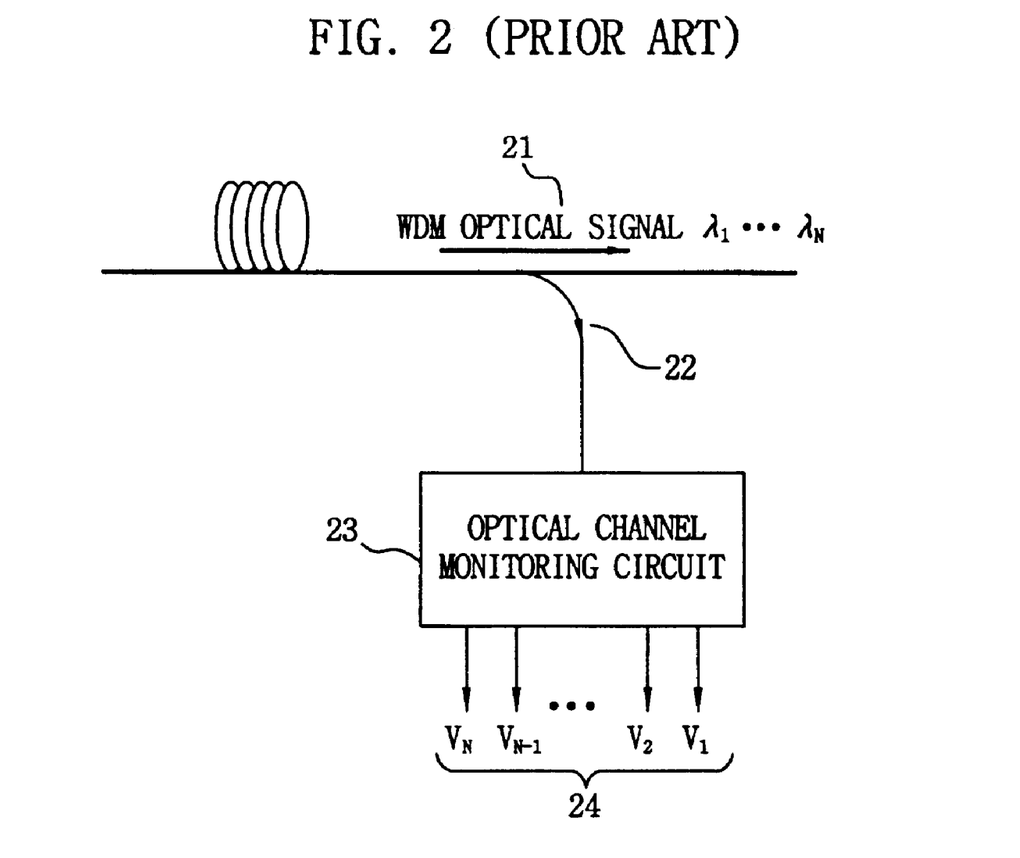
FIG. 2 shows a configuration diagram of a common optical channel monitoring device.

FIG. 2 shows a configuration diagram of a common optical channel monitoring device. The optical channel monitoring technology is used for obtaining information of each channel optical signal, such as optical signal power in the WDM system where optical signals having several channels are multiplexed. Accordingly, the technology is very important when improving the optical amplifier capacity as well as network operating, managing and control in the WDM system.

A portion of WDM optical signal 21 to be monitored is tapped 22 and then the tapped signal is applied to an optical channel monitoring circuit 23. Here, the tapped signal is a little amount which does not affect a signal transmission process. The optical channel monitoring circuit 23 may have information 24 of each channel from the tapped optical signal. The information 24 of each channel indicates an optical power of each channel as an electric signal.

Figure 3:
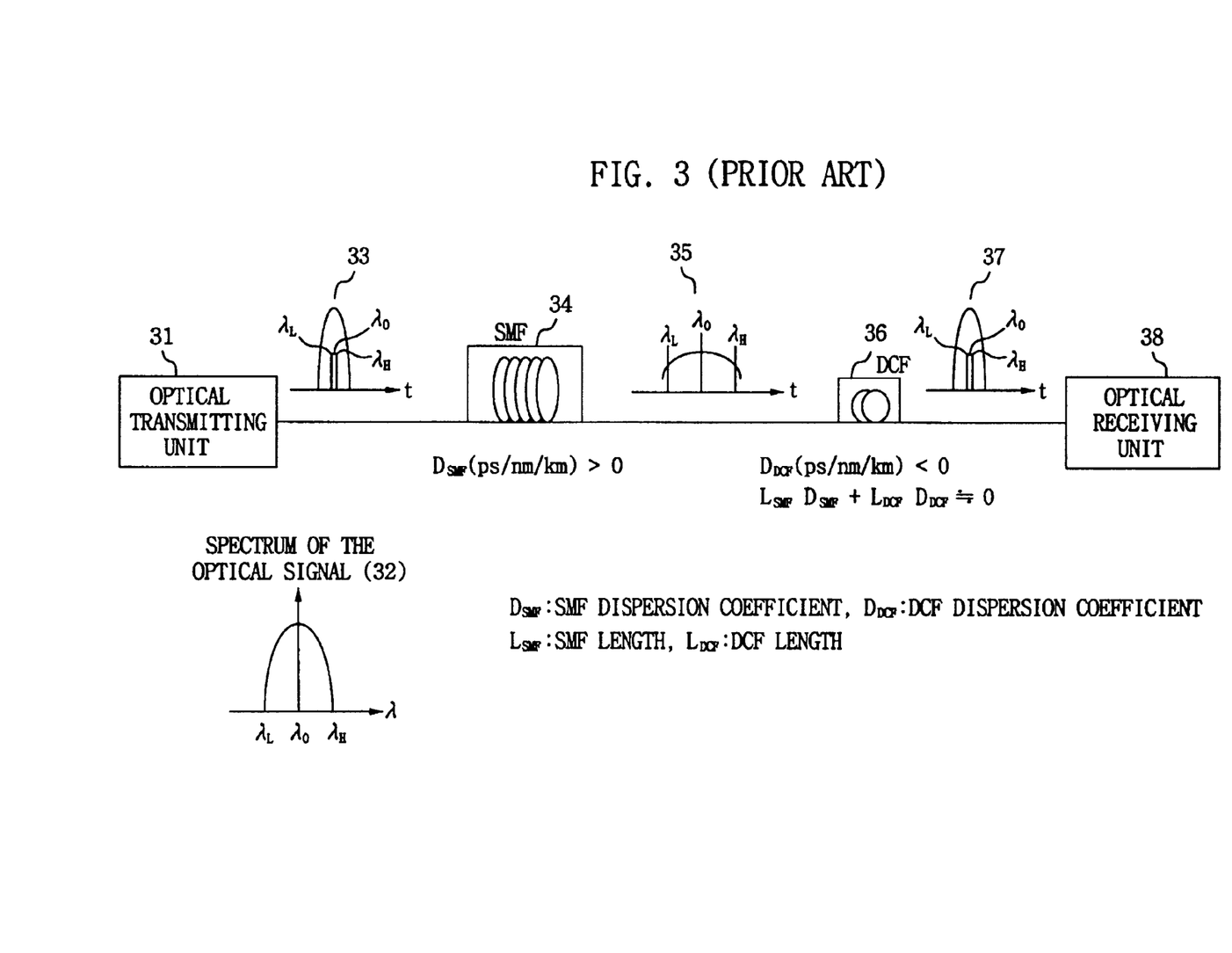
FIG. 3 shows a schematic diagram of the conventional dispersion compensating method using a DCF element.
Figure 4:
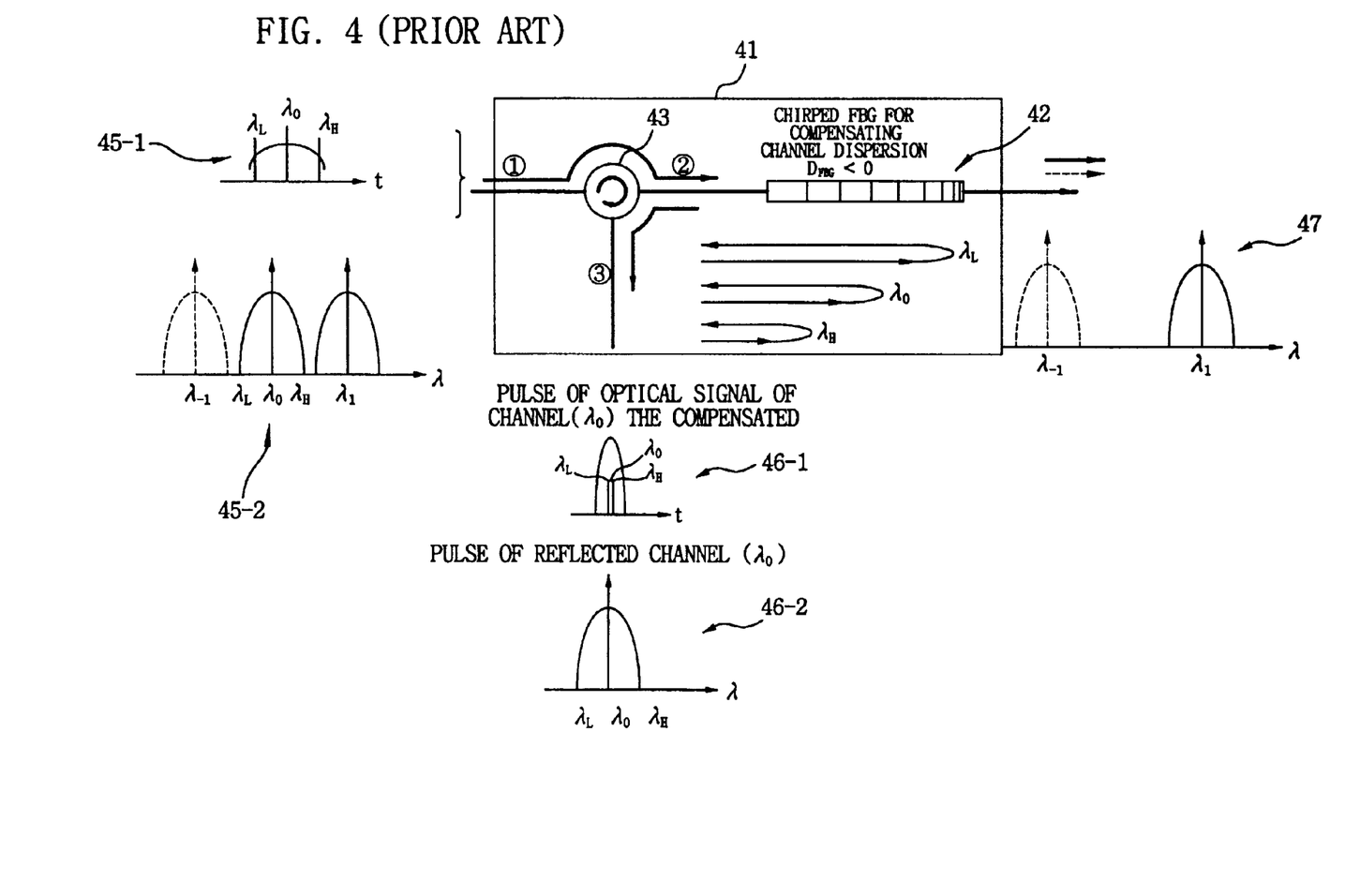
FIG. 4 shows a schematic diagram of the conventional dispersion compensating method using a Chirped FBG element.

Now, referring to FIGS. 3 to 4 the configuration and the operation of the conventional dispersion compensating technology is explained.

The dispersion compensating optical element 13 of FIG. 1 can be a Dispersion Compensating Fiber(DCF), a Chirped Fiber Bragg Grating(Chirped FBG), etc.

FIG. 3 shows a schematic diagram of a conventional dispersion compensating method using the DCF. It is composed of an optical transmitting unit 31, an SMF 34, a DCF 36 and an optical receiving unit 38. Wavelength elements ($\lambda_L \sim \lambda_H$) are limited in a given pulse width before being transmitted, referring to reference No. 33. But the optical signals of the transmitting unit 31 have a widening pulse width, caused by a dispersion effect after the optical signals are transmitted through the SMF 34(referring to No. 35). Here, an SMF dispersion coefficient($D_{SMF}$(ps/nm/km)) has a positive value. The DCF 36 compensates the dispersed optical signal 35 with a negative dispersion value($D_{DCF}$(ps/nm/km<0)) and applies the compensated optical signal pulse 37(same as the pulse 33) to the optical receiving unit 38. In other words, $L_{SMF}*D_{SMF}+L_{DCF}*D_{DCF}\approx 0$). The $L_{SMF}$ is a length of the SMF. The $L_{DCF}$ is a length of the DCF.

Therefore, it is capable to obtain the optical signal without distortion in the optical receiving unit 38 by setting a sum of the dispersion coefficients of the SMF 34 and the DCF 36 to be about "0".

FIG. 4 shows a schematic diagram of a conventional dispersion compensating method using a Chirped FBG element.

A dispersion compensating device 41 is composed of a Chirped FBG element 42 for compensating channel dispersion and a circulator 43. When making gratings on an optical fiber, the chirped FBG element 42 is manufactured to have several different gratings to regulate wavelength path to be long or short. For example, $\lambda_L$ is for a long reflecting path, $\lambda_O$ is for a middle path, and $\lambda_H$ is for a short path. For regulating the dispersion generated in the FBG element by managing the reflective paths according to the wavelengths, a dispersion value of the Chirped FBG element is a value opposite to a dispersion value of the SMF, thereby it is capable of compensating the dispersion distortion. A sum of the dispersion value between the chirped FBG and the SMF is about "0". Because of using the gratings, the compensated optical signal of the Chirped FBG element is a reflective wave. Accordingly, a directional optical element such as the circulator should be used for transmitting the compensated optical signal to the optical receiver.

A signal incoming to first port of the circulator 43 is a distorted optical signal having a channel($\lambda_O$) after passed through the SMF. Reference No. 45-1 is a pulse of the optical signal of the channel($\lambda_O$) in a time zone. And reference No. 45-2 is a spectrum of the WDM optical signal in a frequency zone.

The distorted optical signal is outputted from second port of the circulator 43, passes through several reflective paths at each wavelength by the Chirped FBG element 42 to compensate the dispersion and then is applied to the optical receiver via third port of the circulator 43. The optical signals except wavelength($\lambda_L \sim \lambda_H$) in a dispersion compensating bandwidth having wavelength($\lambda_{-1} \sim \lambda_1$) is passed therethrough, regardless of the FBG grating. A reference No. 47 is output signal spectrums.

Nowadays, the DCF is widely used. However, it is expected that the FBG element will be highly positioned in cost, size, and less error views according to fast development. Recently, the dispersion compensating device having an FBG element is provided for commercial usage.

Now, the configuration and the operation of the conventional optical channel monitoring method will be explained, referring to FIGS. 5 to 6.

Figure 5:
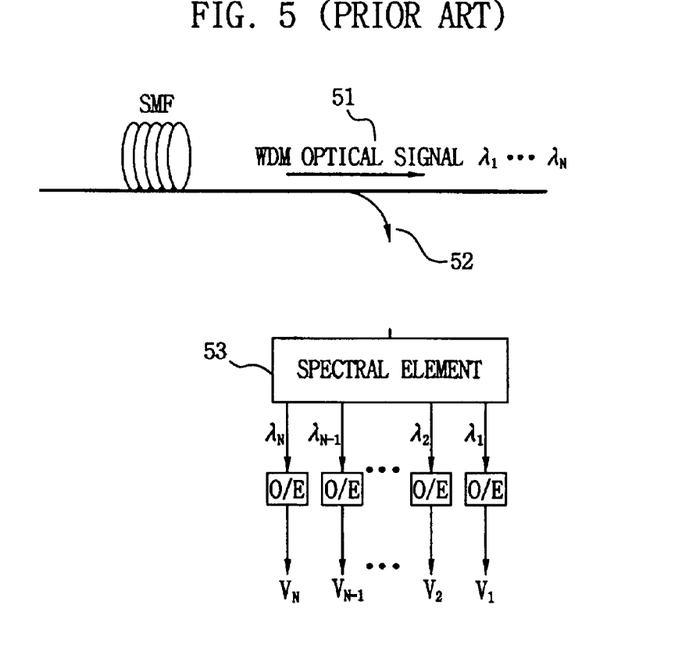
FIG. 5 shows a schematic diagram of a conventional optical channel monitoring device using a spectral element.

FIG. 5 shows a schematic diagram of a conventional optical channel monitoring technology using a spectral element. A portion of WDM optical signal 51 to be monitored is tapped 52 and then the tapped signal is applied to a spectral element 53 which is different from the spectral element (for example, the FBG element in FIG. 4) for compensating dispersion. By using the spectral element 53, the tapped signal is divided into each channel wavelength ($\lambda_1 \sim \lambda_N$).

Each of channel wavelengths($\lambda_1 \sim \lambda_N$) Is converted to electric signals($V_1 \sim V_N$) through corresponding Optical/Electric(O/E) converters, respectively. By using the electric signal, it is capable to measure a signal power of each optical channel. The spectral element is an optical filter, like an Arrayed Waveguide Grating element or a Bulk Grating element.

Figure 6:
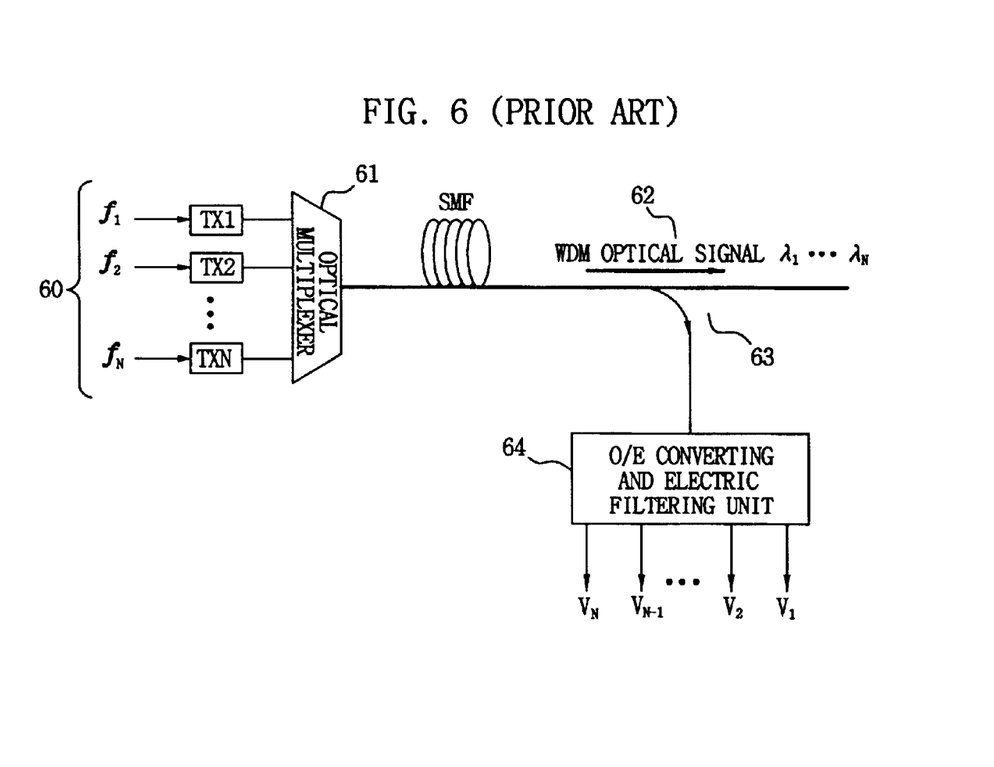
FIG. 6 shows a schematic diagram of a conventional optical channel monitoring device using a tone frequency.

FIG. 6 shows a schematic diagram of a conventional optical channel monitoring device using a tone frequency.

Each of the channel wavelengths($\lambda_1 \sim \lambda_N$) (information channel having several GHz) which is still less than dithered frequency is dithered to a certain frequency($f_1 \sim f_N$) (in other words, tone frequency having several tens KHz) 60. Each of the channel wavelengths($\lambda_1 \sim \lambda_N$) of each optical transmitting unit(TX1($\lambda_1$)~TXN($\lambda_N$)) is multiplexed in an optical multiplexer 61 and then transmitted. The tapped WDM optical signal 63 is applied to an O/E converting and electric filtering unit 64 to monitor the channels and is outputted as electric signals($V_1 \sim V_N$) corresponding to each tone frequencies($f_1 \sim f_N$). The electric signals($V_1 \sim V_N$) indicates an optical power information of each of the channels ($\lambda_1 \sim \lambda_N$) and therefore may check channels. The above method using the tone frequency is applicable in a Lucent WDM transmission device.

Because the conventional optical channel dispersion compensating and monitoring technologies are different in functions and size of the devices which are not small, each unit is separately implemented and installed on the WDM transmission device.

SUMMARY

Accordingly, in order to solve the problems in the prior art it is first object of the present invention to provide an optical channel dispersion compensating and monitoring apparatus, the apparatus may compensate a dispersion of the optical signal in a reflective wave shape and convert a portion of the compensated optical signal(an optical power value) to electric signal respectively.

And second object of the present invention provides a WDM optical amplifier having the optical channel dispersion compensating and monitoring apparatus which is enough to small to be installed inside of the WDM amplifier, therefore capable of controlling noise and having gain flatness of the overall optical amplifier.

In an embodiment to achieve first object of the present invention, Wavelength Division Multiplexing (WDM) optical channel dispersion compensating and monitoring apparatus when transmitting optical signal in a WDM system, compensates the optical signal distorted in an optical fiber at each channel and monitors each channel by using a portion of the compensated optical signal.

In another embodiment to achieve first object of the present invention, WDM optical channel dispersion compensating and monitoring apparatus in a WDM system, groups a plurality of distorted optical signals according to capacity of wideband chirped FBG elements, compensates the grouped distorted optical signals respectively and monitors each channel by using a portion of the compensated optical signal.

In other embodiment to achieve second object of the present invention, an optical amplifier in a WDM system comprises a WDM optical channel dispersion compensating and monitoring apparatus for compensating the optical signal distorted in an optical fiber at each channel and monitoring each channel by using a portion of the compensated optical signal, a controller for controlling output characteristics of the amplifier according to the channel monitored by the apparatus, and a WDM optical amplifying unit for amplifying the compensated optical signal.

BRIEF DESCRIPTION

Other objects, features and advantages of the present invention will become more apparent from the following detailed description when read in conjunction with the accompanying drawings, in which.

DETAILED DESCRIPTION OF THE PREFERRED EMBODIMENTS

Embodiments of the invention will be described with reference to the drawings.

When an optical signal generated from an optical transmitter transmits to an optical receiver through a Single Mode Fiber(SMF), an optical channel dispersion compensating and monitoring device compensates dispersion of the optical signal and then monitors the optical signal of the channel according to the present invention. The device will be now explained in detail.

Figure 7:
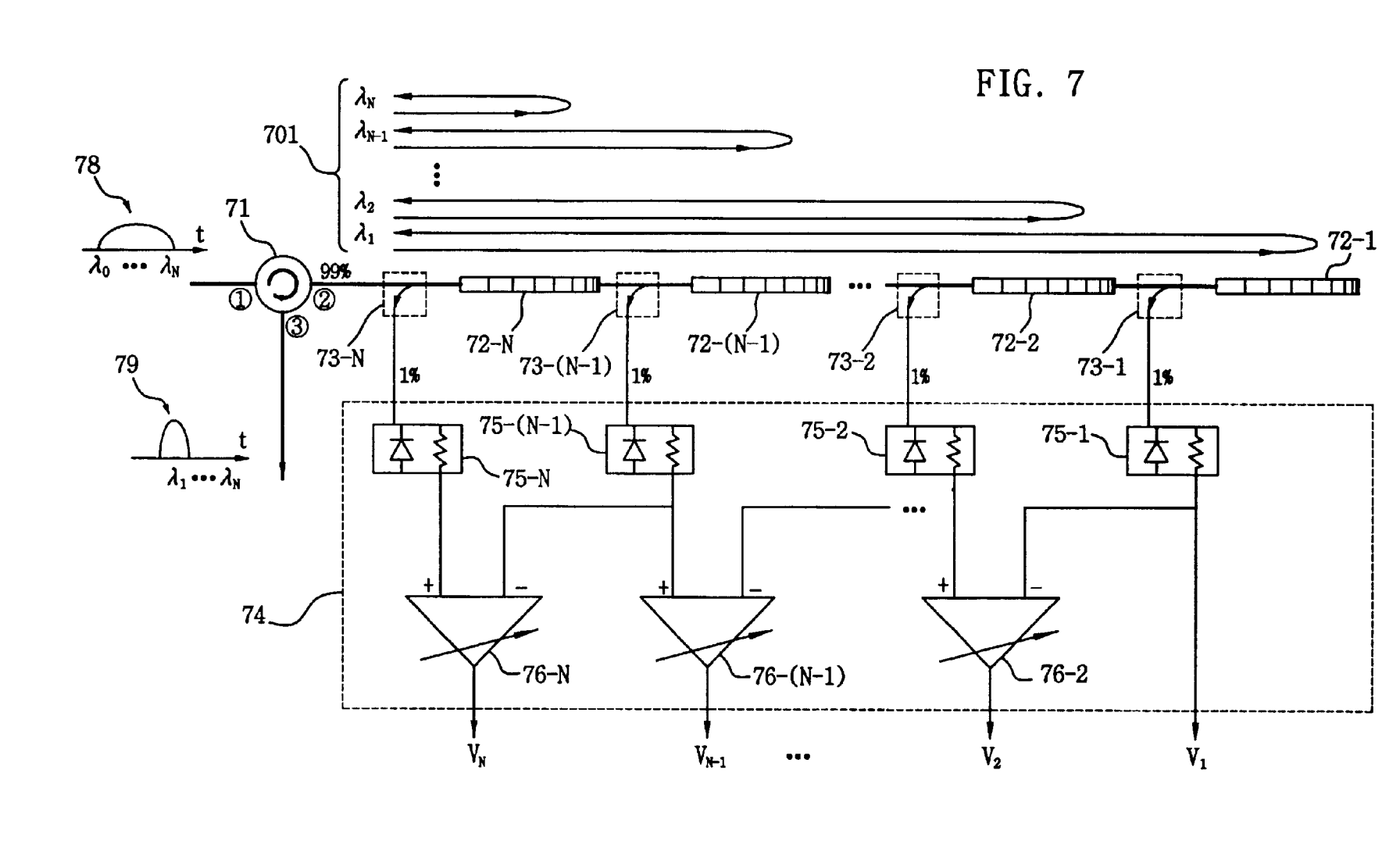
FIG. 7 shows a schematic diagram of a channel dispersion compensating and monitoring device according to one embodiment of the present invention.

FIG. 7 shows a schematic diagram of an optical channel dispersion compensating and monitoring device according to one embodiment of the present invention.

The optical channel dispersion compensating and monitoring device is composed of a circulator 71 of which first port is connected to the SMF, chirped FBG elements 72-1~72-N connected to second port of the circulator 71, a plurality of tap couplers 73-1~73-N, and an optical channel monitoring circuit 74 for monitoring the optical channels.

The circulator 71 transmits a distorted WDM optical signal to the chirped FBG elements 72-1~72-N, and transmits a compensated WDM optical signal reflected by the chirped FBG elements 72-1~72-N to other optical fiber.

The chirped FBG elements 72-1~72-N are arranged in serial as many as the channel number of the WDM optical signal. Each chirped FBG element 72-i allocated at each channel($\lambda_i$) compensates the distorted optical signal of the corresponding channel.

A plurality of the tap couplers 73-1~73-N are located in front of each of the chirped FBG elements 72-1~72-N. The tap couplers 73-1~73-N taps a portion of WDM optical signal which is reflected by each chirped FBG element and transmits the tapped WDM optical signal to the optical channel monitoring circuit 74.

The optical channel monitoring circuit 74 converts an optical power of each tapped signal to an electric signal.

Figure 8:
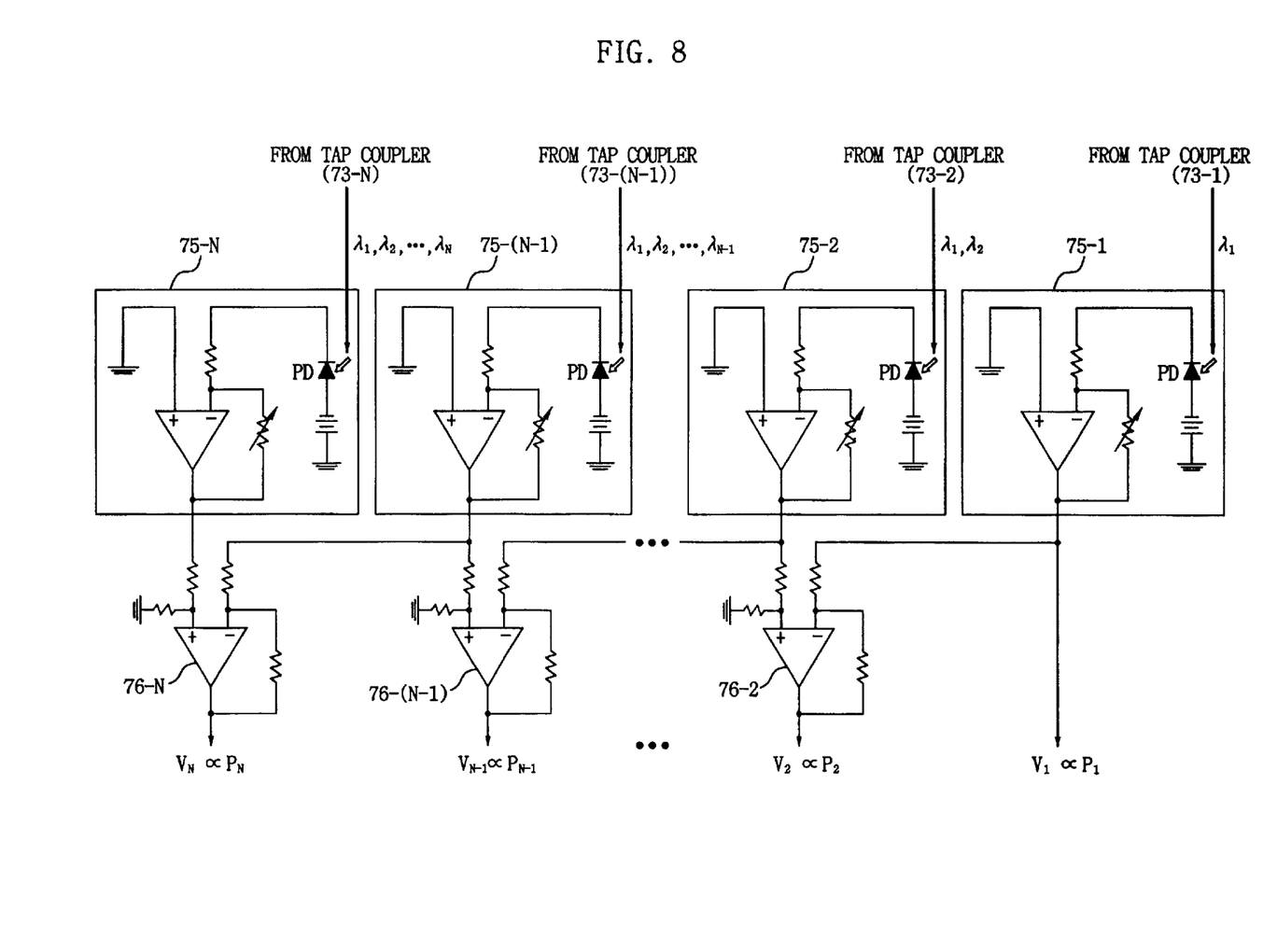
FIG. 8 shows a detailed block diagram about the channel monitoring circuit of FIG. 7.

Referring to FIGS. 7 to 8, operation of embodiment of the present invention will be explained.

Referring to FIG. 7, the distorted WDM optical signal 78 (having N channels) is inputted to the first port of the circulator 71 and is processed to the second port of the circulator 71 according to a designated direction. And the second port of the circulator 71 is connected to a chirped FBG element 72-N for compensating the Nth channel which is serially connected to a chirped FBG element 72-(N−1) for compensating the (N−1)th channel, . . . , a chirped FBG element 72-2 for compensating the second channel and a chirped FBG element 72-1 for compensating the first channel in order. In addition, corresponding tap couplers 73-N~73-1 are located in front of each FBG element for tapping the portion of signal of the compensated each channel, respectively.

The distorted WDM optical signal inputted to the second port of the is circulator 71 is compensated by each chirped FBG element 72-1~72-N and the signal reflected in each chirped FBG element 72-1~72-N is returned to the second port of the circulator 71. Each FBG element compensates signal of each allocated channel to a reflective wave shape and passes other channels to next FBG elements. Reflective waves of each channel are referred to reference No. 701. In other words, first channel($\lambda_1$) is reflected in the chirped FBG element 72-1, second channel($\lambda_2$) is reflected in the chirped FBG element 72-2, third channel($\lambda_3$) is reflected in the chirped FBG element 72-3, . . . , (N−1)th channel($\lambda_{N-1}$) is reflected in the chirped FBG element 72-(N−1), and Nth channel($\lambda_N$) is reflected in the chirped FBG element 72-N.

The compensated WDM optical signal, having a reflective shape, returned to the second port of the circulator 71 is completed to compensate dispersion inputting the signal to third port of the circulator 71. Pulse of the compensated WDM optical signal is referred to reference No. 79.

A portion of each reflected channel signal is tapped by each tap coupler 72-N~72-1 located on between the circulator 71 and the FBG element 72-N, and between each FBG elements(72-(N−1)~72-1), respectively. A tapping rate is less than 1% of each channel signal.

The tapped optical signal is transmitted to the optical channel monitoring circuit 74. Referring to FIG. 7, the optical channel monitoring circuit 74 is composed of a plurality of Optical/Electric(O/E) converters 75-N~75-1 for converting each tapped signal to voltage value, and a plurality of variable subtracters 76-N~76-2 for calculating optical power of each channel from the converted electric signal. The O/E converters 75-N~75-1 detects the tapped signal by photo detectors(PDs) and linearly converts the optical power to voltage value. Each variable subtracter 76-N~76-2 may regulate input voltage rate to correct differences among optical powers of each PD and among losses of each tap coupler.

FIG. 8 shows a detailed block diagram of the channel monitoring circuit of FIG. 7.

Referring to FIG. 8, the optical signal tapped from the tap coupler 73-1 located in front of the FBG element 72-1 for the first channel is a signal of the first channel($\lambda_1$) because the optical signal is reflected from the FBG element 72-1. In case that the optical signal of the first channel($\lambda_1$) is converted to an electric signal through the O/E converter 75-1, the electric signal($V_1$) corresponding to the optical power ($P_1$) of the first channel can be easily obtained ($V_1 \propto P$.

The optical signal tapped by the tap coupler 73-2 located in front of the FBG element 72-2 for second channel includes signals of the first and second channels($\lambda_1$, $\lambda_2$) because the optical signal is reflected from the FBG element 72-1 and the FBG element 72-2. In case that the optical signals are converted to electric signals through the O/E converter 75-2, the electric signals($V_{1+2}$) corresponding to the optical powers($P_1+P_2$) of the first and second channels can be obtained($\lambda_1$, $\lambda_2$)($V_{1+2} \propto (P_1+P_2)$). Because of linearity between the optical power and the electric signal, it may require an electric signal corresponding to the optical power of the second channel($\lambda_2$) only, in case of subtracting the electric signal of the first channel($\lambda_1$) from the electric signal of the first and second channels($\lambda_1$, $\lambda_2$) can be obtained ($V_{1+2}-V_1=V_2 \propto P_2$). The electric subtracter 76-2 is used for above process.

Similarly, the optical signal tapped from the tap coupler 73-N located in front of the FBG element 72-N is for all channels because the optical signals are reflected from the FBG elements 72-1~72-N. In case that the optical signals are converted to electric signals through the O/E converter 75-N, it may acquire the electric signals($V_{1+2+ \ldots +N}$) corresponding to the optical powers($P_1+P_2+ \ldots +P_N$) of the all channels($\lambda_{1+2+ \ldots +N}$)($V_{1+2+ \ldots +N} \propto (P_1+P_2+ \ldots +P_N)$). It may acquire an electric signal corresponding to the optical power of the Nth channel only, in case of subtracting the electric signal of the all channels except the Nth channel from the electric signal of all channels($V_N \propto P_N$).

By using N O/E converters and (N−1) subtracters according to the number(N) of channel, it may acquire the electric signals from the optical power of each channel. Unexplained resistors and amplifiers are employed for a controllable electrical circuit for compensating losses caused by the tap couplers and optical/electrical characteristics of the O/E converter.

Figure 9:
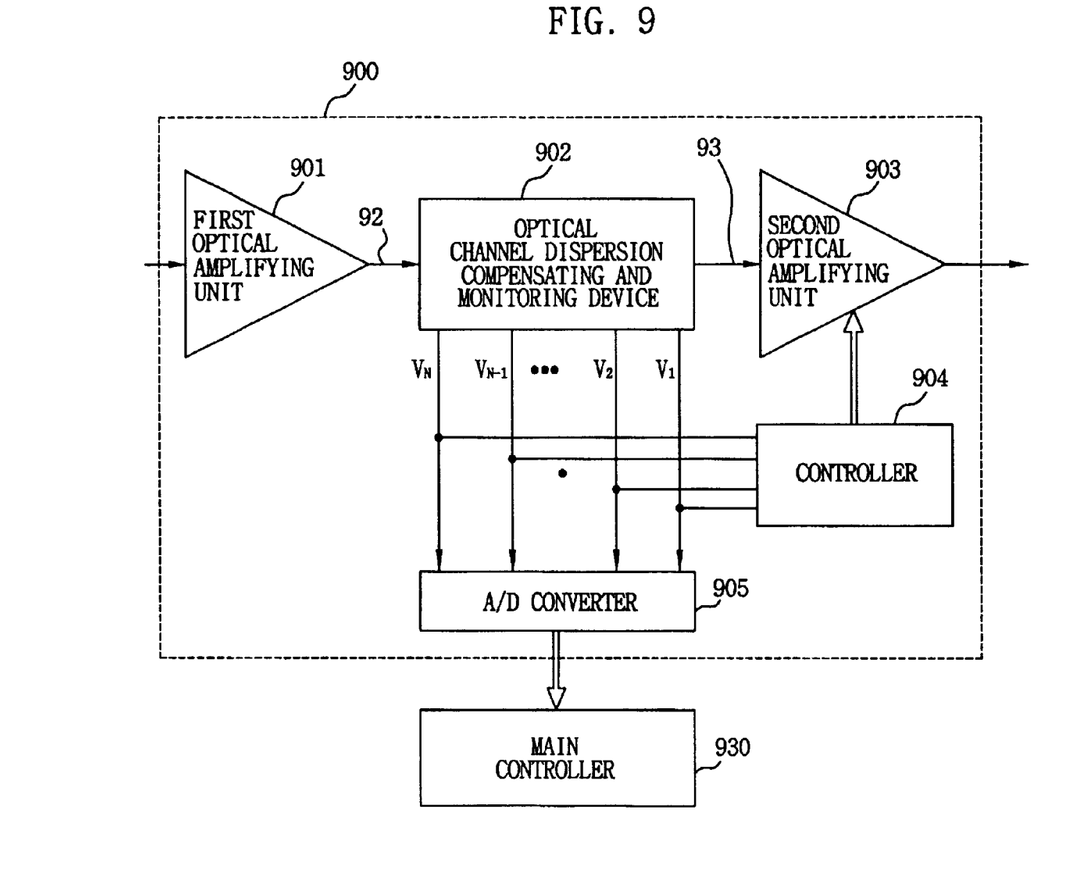
FIG. 9 shows a configuration diagram of a WDM optical amplifier comprising the device of FIG. 7.

FIG. 9 shows a configuration diagram of a WDM optical amplifier comprising the device of FIG. 7.

An optical amplifier 900 is a WDM optical amplifier for a long distance, including a first optical amplifying unit 901 for amplifying WDM input signal, an optical channel dispersion compensating and monitoring device 902, a second optical amplifying unit 903 for amplifying the compensated optical channel, a controller 904 for controlling gain of the second optical amplifying unit 903, and an A/D converter 905 for converting the electric signals $V_1 \sim V_N$ corresponding to the optical power of the device 902, to digital values and providing the digitized values to a main controller 930 of an outer system.

Figure 10:
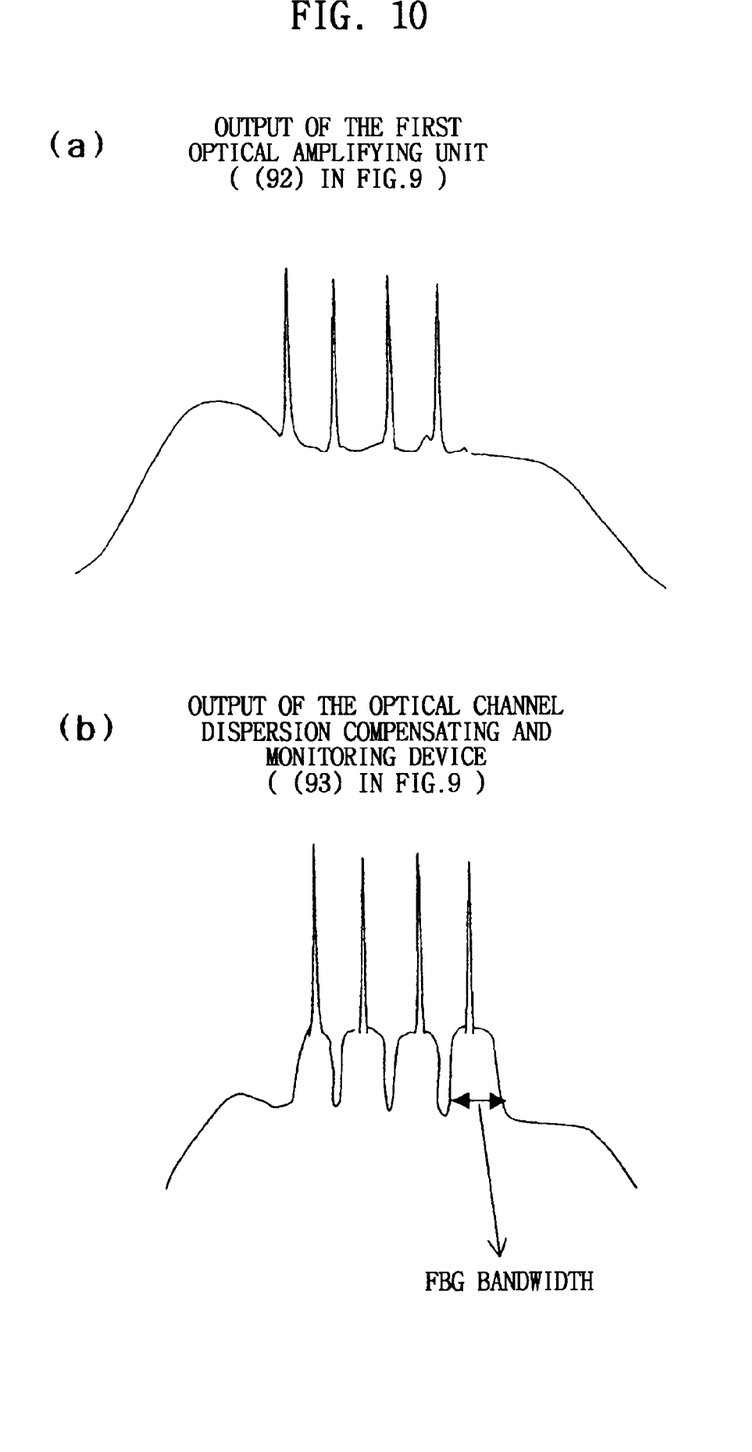
FIG. 10 shows a spectrum indicating noise control effect of the WDM optical amplifier of FIG. 9.

In case that the device 902 is installed inside of the optical amplifier 900, it helps to controlling amplifier noise. In other words, limited bandwidth of each FBG element helps to filtering noises of outer band, therefore it has better characteristics about the optical amplifier noise, as can be found by comparing output 92 of the first optical amplifying unit 901 and output 93 of the device 902, referring to FIG. 10.

In case of installing the device 902 inside of the optical amplifier 900, it may establish the optical amplifier having a better gain flatness by using the characteristics that the loss of the device 902 differs according to arranging orders of the chirped FBG elements. In other words, there are different characteristics by the arranging order because the number of the tap couplers can be decreased according to arrangement of the chirped FBG elements.

Figure 11:
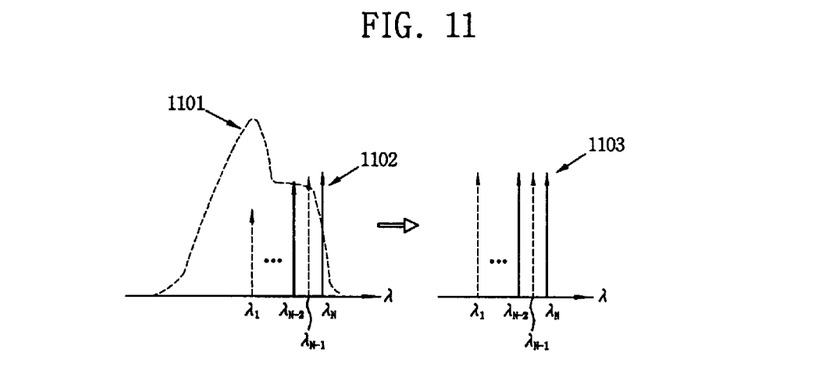
FIG. 11 shows a spectrum indicating a gain flatness improvement effect of the WDM optical amplifier of FIG. 9.

Referring to FIG. 11, reference No. 1101 indicates a gain characteristic of the second optical amplifying unit 903(in FIG. 9). Reference No. 1102 indicates outputs of the device 902 according to the chirped FBG element arrangement order concerning the gain characteristics. The output 1103 of the optical amplifier 900 has a better gain characteristics because the $\lambda_1$ is amplified and the $\lambda_N$ is decreased.

By establishing the amplifier having the optical channel dispersion compensating and monitoring device inside of the optical amplifier, it may compensate the dispersion of the distorted WDM optical signal and the signal having the monitored channel can be used for controlling the gain and the output power.

Figure 12:
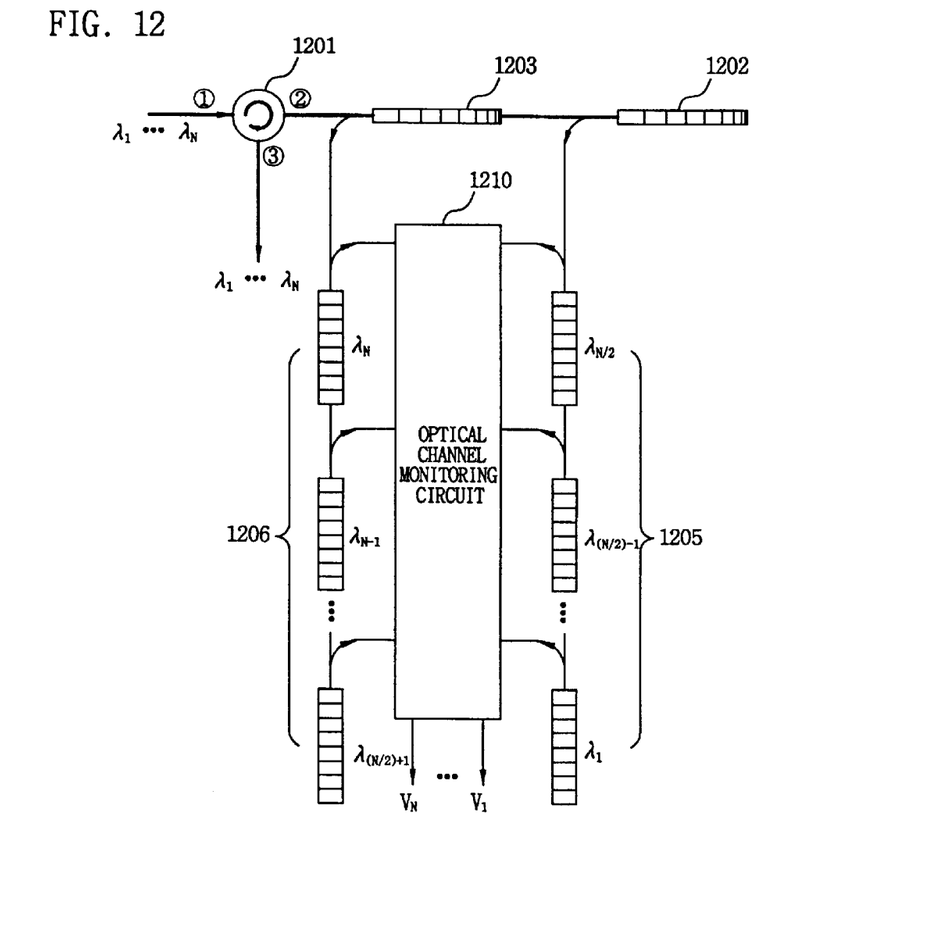
FIG. 12 shows a configuration diagram of a channel dispersion compensating and monitoring device according to another embodiment of the present invention.

FIG. 12 shows a configuration diagram of a channel dispersion compensating and monitoring device according to another embodiment of the present invention. Another embodiment may be useful when dispersion bandwidth of the chirped FBG element is so wide to include several channels.

The present invention includes a circulator 1201 having 3 ports and wideband chirped FBG elements 1202, 1203 for compensating dispersion of optical signals in serial connected to a second port of the circulator 1201. The wideband chirped FBG element 1202 compensates the dispersion from the first channel($\lambda_1$) to (N/2)th channel($\lambda_{N/2}$). And the wideband chirped FBG element 1203 compensates the dispersion from the ((N/2)+1)th channel($\lambda_{(N/2)+1}$) to Nth channel($\lambda_N$). Accordingly, there is an advantage that loss may be decreased, caused by the tap couplers 73-1~73-N and the chirped FBG elements 72-1~72-N of the compensated optical signals in FIG. 7.

Two sub-FBG element groups 1205, 1206 are composed of a plurality of FBG elements for monitoring each channel which is compensated from two chirped FBG elements 1202, 1203. A plurality of the FBG elements are employed by common FBG elements, having no dispersion function.

An optical channel monitoring circuit 1210 outputs electric signals($V_1 \sim V_N$) for monitoring a corresponding optical signal from each FBG element of the two sub-FBG element groups 1205, 1206. It may be established by the same principle as the optical channel monitoring circuit 74 in FIG. 8.

A plurality of tap couplers positioned in front of each FBG element, taps a portion of the signal reflected by the FBG elements.

The operation of another embodiment will be explained.

First, the dispersion compensating process is explained. The distorted WDM optical signal (having N channels) is inputted to first port of the circulator 1201 and outputted to second port of the circulator 1201. And the optical signal is compensated by the wideband chirped FBG elements 1202, 1203. The compensated WDM optical signal is a respective wave and is returned to the second port and outputted to third port of the circulator 1201.

Second, the channel monitoring process is explained. After tapping the channel compensated from the chirped FBG elements 1202, 1203, the electric signal corresponding to the optical power of each channel is obtained. The tapped signals in front of the chirped FBG element 1202 are the optical signals of the channels($\lambda_1 \sim \lambda_{N/2}$). And the tapped signals in front of the chirped FBG element 1203 are the optical signals of the channels($\lambda_{(N/2)+1} \sim \lambda_N$).

The sub-FBG element group 1205 includes a plurality of FBG elements connected in serial for reflecting the optical signals of each channel($\lambda_1 \sim \lambda_{N/2}$) respectively. And the sub-FBG element group 1205 applies tapped channels to the optical channel monitoring circuit 1210 by tapping the reflected channels ($\lambda_1 \sim \lambda_{N/2}$).

For example, the tapped signal reflected by the FBG element for the channel($\lambda_1$) is the optical signal of the channel($\lambda_1$). The tapped signal reflected by the FBG element for the channel($\lambda_2$) includes the optical signal of the channels($\lambda_1$, $\lambda_2$). The tapped signal reflected by the FBG element for the channel($\lambda_{N/2}$) includes the optical signal of the channels($\lambda_1$, $\lambda_2$, . . . , $\lambda_{N/2}$).

The sub-FBG element group 1206 has the same structure as the sub-FBG element group 1205 and operates like the sub-FBG group 1205, equally. In other words, the sub-FBG element group 1206 includes a plurality of FBG elements connected in serial for reflecting the optical signals of each channel($\lambda_{(N/2)+1} \sim \lambda_N$) and applies tapped channel to the optical channel monitoring circuit 1210 by tapping the reflected signal of each channel($\lambda_{(N/2)+1} \sim \lambda_N$).

The optical channel monitoring circuit 1210 calculates the optical power of each channel by using O/E converters and electric subtracters, as explained in FIG. 8.

By establishing the channel dispersion compensating and monitoring apparatus using the chirped FBG element, there are advantages that the hardware size may be decreased and designing cost as well.

In addition, it is essential to improve capability of the optical amplifier that the channel dispersion compensating and monitoring apparatus is installed in the optical amplifier and applicable for a high capability WDM optical amplifier for a long distance.

The optical amplifier comprising the apparatus controls gain and output power of the amplifier by using the channel dispersion compensated and monitored signal. And the amplifier may improve noise characteristics by excluding noise by using a limited bandwidth of each FBG element. And the amplifier may flat gain characteristics of overall optical amplifier in case that the arrangement order of the chirped FBG elements is designated by concerning the gain characteristics of the optical amplifier.

The present invention is not limited to the specifically disclosed embodiments, and variations and modifications may be made without departing from the scope of the present invention.

What is claimed is:

1. A Wavelength Division Multiplexing (WDM) optical channel dispersion compensating and monitoring apparatus comprising a plurality of chirped FBG elements arranged in a serial configuration, wherein the apparatus dispersion compensates each optical channel of a WDM optical signal that is distorted by dispersion in an optical fiber and monitors each optical channel by monitoring at least two portions of the dispersion compensated optical signal at different points along an optical path of the dispersion compensated optical signal, wherein each of the at least two portions of the dispersion compensated optical signal includes a different number of optical channels.

2. WDM optical channel dispersion compensating and monitoring apparatus as claimed in claim 1, wherein the apparatus comprises:
   a dispersion compensating unit, comprising the plurality of chirped FBG elements arranged in a serial configuration, for dispersion compensating each optical channel of the WDM optical signal, which is distorted in the optical fiber when the WDM optical signal is transmitted from an optical transmitter to an optical receiver through the optical fiber, and
   an optical channel monitoring unit for converting an optical power of the at least two portions of the dispersion compensated WDM optical signal to a plurality of electric signals and monitoring each of the electric signals, wherein each of the plurality of electric signals correspond to a respective optical channel.

3. WDM optical channel dispersion compensating and monitoring apparatus as claimed in claim 2, wherein the apparatus further comprises an optical signal transmitting unit having several ports for designating paths for processing of the WDM optical signal.

4. WDM optical channel dispersion compensating and monitoring apparatus as claimed in claim 2, wherein each of the plurality of chirped FBG elements dispersion compensates a respective optical channel.

5. WDM optical channel dispersion compensating and monitoring apparatus as claimed in claim 2, wherein the dispersion compensating unit compensates dispersion of the optical signal through the chirped FBG elements, and transmits the signal in a reflective wave shape.

6. WDM optical channel dispersion compensating and monitoring apparatus as claimed in claim 3, wherein the optical signal transmitting unit comprises:
   a first port, to which the distorted WDM optical signal is inputted;
   a second port for transmitting the distorted WDM optical signal to the dispersion compensating unit, and for receiving a reflective wave compensated by the chirped FBG elements; and
   a third port for transmitting the reflective wave to another optical fiber.

7. WDM optical channel dispersion compensating and monitoring apparatus as claimed in claim 1, wherein the number of chirped FBG elements is the same as the number of optical channels in the WDM optical signal.

8. A WDM optical channel dispersion compensating and monitoring apparatus in a WDM system, wherein the apparatus groups a plurality of dispersion distorted optical channels of a WDM optical signal in accordance with a capacity of at least two wideband chirped FBG elements arranged in a serial configuration, respectively dispersion compensates the grouped dispersion distorted optical channels and monitors each optical channel by monitoring at least two portions of the dispersion compensated WDM optical signal at different points along an optical path of the dispersion compensated optical signal, wherein each of the at least two portions of the dispersion compensated WDM optical signal includes a different number of optical channels.

9. An optical amplifier in a WDM system, wherein the amplifier comprises:
   a WDM optical channel dispersion compensating and monitoring apparatus for dispersion compensating each optical channel of a WDM optical signal dispersion distorted in an optical fiber and for monitoring each optical channel by monitoring at least two portions of the dispersion compensated optical signal at different points along an optical path of the dispersion compensated optical signal, wherein the dispersion compensating and monitoring apparatus comprises a plurality of chirped FBG elements arranged in a serial configuration for dispersion compensating each optical channel of the WDM optical signal and wherein each of the at least two portions of the dispersion compensated optical signal includes a different number of optical channels;
   a controller for controlling output characteristics of the amplifier according to the channel monitored by the apparatus; and
   a WDM optical amplifying unit for amplifying the dispersion compensated optical signal.

10. A Wavelength Division Multiplexing (WDM) optical channel dispersion compensating and monitoring apparatus when transmitting WDM optical signal in a WDM system, wherein the apparatus compensates the optical signal distorted in an optical fiber at each channel and monitors each channel by using a portion of the compensated optical signal, the apparatus comprising:
   a dispersion compensating unit comprising a plurality of chirped FBG elements for compensating dispersion of the optical signal of the corresponding channel distorted in the optical fiber when the optical signal transmits from an optical transmitter to an optical receiver through the optical fiber;
   a plurality of tap couplers located in front of a plurality of the chirped FBG elements, respectively, for tapping portions of reflective waves (optical signals) passed through the chirped FBG elements; and
   an optical channel monitoring unit for converting an optical power of the portion of the compensated optical signal to electric signals and monitoring the converted electric signals, the optical channel monitoring unit comprising a plurality of optical/electric (O/E) converters connected to each tap coupler, for converting the tapped optical signal to electric signals without other spectral elements.

11. The WDM optical channel dispersion compensating and monitoring apparatus of claim 10, wherein the optical channel monitoring unit comprises a plurality of substracters connected to a plurality of the O/E converters for excluding optical power except an optical power of a certain channel for selecting an electric signal corresponding to the optical power of the certain channel in case that the electric signal has a sum of several optical channels, and further comprising an optical signal transmitting unit having several ports for designating paths for processing of the WDM optical signal, the optical signal transmitting unit comprising,
   a first port, to which the distorted WDM optical signal is inputted,
   a second port for transmitting the optical signal to the dispersion compensating unit, the reflective wave compensated by the chirped FBG elements being returned to the second port, and a third port for transmitting the reflective wave to other optical fiber.

12. A WDM optical channel dispersion compensating and monitoring apparatus in a WDM system, wherein the apparatus groups a plurality of distorted optical signals according to capacity of wideband chirped FBG elements, compensates the grouped distorted optical signals respectively and monitors each channel by using a portion of the compensated optical signal, wherein the apparatus comprises:

a dispersion compensating unit comprising a plurality of the wideband chirped FBG elements having such wide bandwidth to compensate a plurality of the distorted WDM optical channels when the optical signal is transmitted from an optical transmitter to an optical receiver through the optical fiber;

a plurality of tap couplers for tapping the portion of the optical signals reflected by a plurality of the FBG elements;

at least one optical element group for dividing the tapped signals into each optical channel respectively; and an optical channel monitoring unit for converting an optical power of the portion of the compensated optical signals to electric signals and monitoring the converted electric signals, wherein the optical channel monitoring unit comprises, a plurality of optical/electric (O/E) converters for converting the tapped optical signals to electric signals, and a plurality of substracters connected to a plurality of the O/E converters for excluding optical power except an optical power of a certain channel in case that the electric signal has a sum of several optical channels.

13. An optical amplifier in a WDM system, wherein the amplifier comprises:

a WDM optical channel dispersion compensating and monitoring apparatus for compensating the optical signal distorted in an optical fiber at each channel and monitoring each channel by using a portion of the compensated optical signal;

a controller for controlling output characteristics of the amplifier according to the channel monitored by the apparatus; and a WDM optical amplifying unit for amplifying the compensated optical signal, the WDM optical amplifying unit comprising an A/D converter for digitizing electric signals ($V_1$~$V_N$) corresponding to each optical power of each channel of the apparatus and applying the digital values to outer devices.

14. An optical amplifier in a WDM system, wherein the amplifier comprises:

a WDM optical channel dispersion compensating and monitoring apparatus for compensating the optical signal distorted in an optical fiber at each channel and monitoring each channel by using a portion of the compensated optical signal, the WDM optical channel dispersion compensating and monitoring apparatus comprising, a dispersion compensating unit comprising a plurality of FBG elements for compensating dispersion of WDM optical signal according to a corresponding channel, an optical channel monitoring unit for converting an optical power of the portion of the compensated optical signals to electric signals and monitoring the converted electric signals, a plurality of tap couplers for tapping the portion of the optical signals reflected by plurality of the FBG elements, a plurality of optical/electric (O/E) converters for converting the tapped optical signal to electric signals, and a plurality of substracters connected to a plurality of the O/E converters for excluding optical power except an optical power of a certain channel for selecting an electric signal corresponding to the optical power of the certain channel in case that the electric signal has a sum of several optical channels;

a controller for controlling output characteristics of the amplifier according to the channel monitored by the apparatus; and a WDM optical amplifying unit for amplifying the compensated optical signal.

15. The WDM optical channel dispersion compensating and monitoring apparatus as claimed in claim 10, wherein the optical channel monitoring unit further comprises a respective substracter connected to each O/E converter for excluding optical power except an optical power of a predetermined optical channel for selecting an electric signal corresponding to the optical power of the predetermined optical channel when the electric signal has a sum of several optical channels.

16. A Wavelength Division Multiplexing (WDM) optical channel dispersion compensating and monitoring apparatus when transmitting WDM optical signal in a WDM system, wherein the apparatus compensates the optical signal distorted in an optical fiber at each channel and monitors each channel by using a portion of the compensated optical signal, the apparatus comprising:

a dispersion compensating unit comprising a plurality of chirped FBG elements for compensating dispersion of the optical signal of the corresponding channel distorted in the optical fiber when the optical signal transmits from an optical transmitter to an optical receiver through the optical fiber;

a plurality of tap couplers located in front of a plurality of the chirped FBG elements, respectively, for tapping portions of reflective waves (optical signals) passed through the chirped FBG elements; and an optical channel monitoring unit for converting an optical power of the portion of the compensated optical signal to electric signals and monitoring the converted electric signals, wherein each of the electric signals correspond to a respective optical channel.

17. A WDM optical channel dispersion compensating and monitoring apparatus in a WDM system, wherein the apparatus groups a plurality of distorted optical signals according to capacity of wideband chirped FBG elements, compensates the grouped distorted optical signals respectively and monitors each channel by using a portion of the compensated optical signal, wherein the apparatus comprises:

a dispersion compensating unit comprising a plurality of the wideband chirped FBG elements having such wide bandwidth to compensate a plurality of the distorted WDM optical channels when the optical signal is transmitted from an optical transmitter to an optical receiver through the optical fiber;

a plurality of tap couplers for tapping the portion of the optical signals reflected by a plurality of the FBG elements;

at least one optical element group for dividing the tapped signals into each optical channel respectively; and an optical channel monitoring unit for converting an optical power of the portion of the compensated optical signals to electric signals and monitoring the converted electric signals, wherein each of the electric signals correspond to a respective optical channel.

18. The WDM optical channel dispersion compensating and monitoring apparatus as claimed in claim 17, wherein at least one optical element group comprises FBG elements that are serially connected, wherein each FBG element reflects a respective predetermined wavelength band.

19. An optical amplifier in a WDM system, wherein the amplifier comprises:

a WDM optical channel dispersion compensating and monitoring apparatus for dispersion compensating the optical signal distorted in an optical fiber at each channel and monitoring each channel by monitoring at least two portions of the dispersion compensated optical signal at different points along an optical path of the dispersion compensated optical signal, wherein each of the at least two portions of the dispersion compensated optical signal includes a different number of optical channels, the WDM optical channel dispersion compensating and monitoring apparatus comprising, a dispersion compensating unit comprising a plurality of FBG elements for compensating dispersion of WDM optical signal according to a corresponding channel, and an optical channel monitoring unit for converting an optical power of the at least two portions of the dispersion compensated optical signal to electric signals and monitoring the converted electric signals;

a controller for controlling output characteristics of the amplifier according to the channel monitored by the apparatus; and a WDM optical amplifying unit for amplifying the dispersion compensated optical signal.

20. An optical amplifier as claimed in claim 19, wherein the FBG elements are arranged in an order that will optimize a gain flatness of the optical amplifier.

* * * * *